Figure 1:
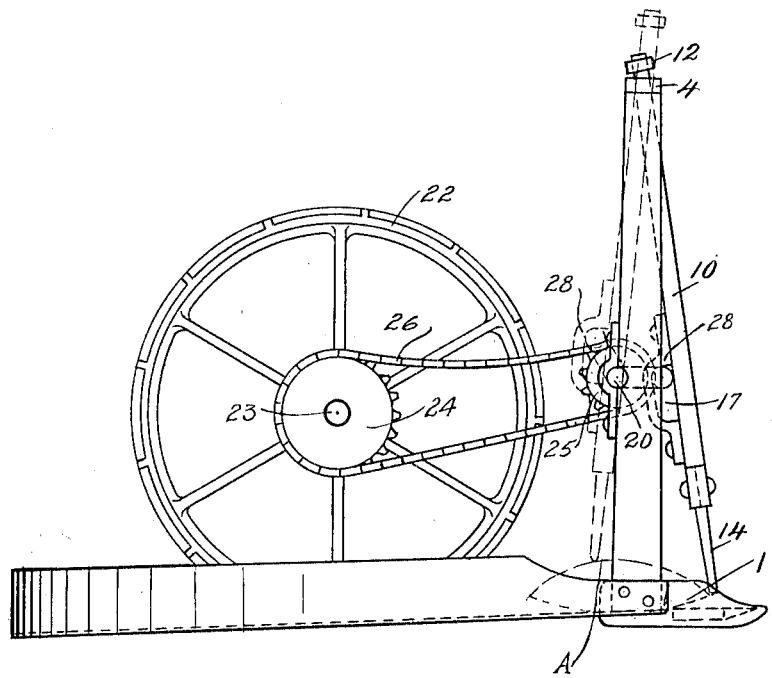

J. J. LEACH.
CUTTER BAR RAKING DEVICE.
APPLICATION FILED FEB. 23, 1912.

1,080,568.

Patented Dec. 9, 1913.

2 SHEETS—SHEET 1.

Witnesses
Dorothy Wendland
Elizabeth Kipp

Inventor
John J. Leach
By John H. Boss
his Attorney

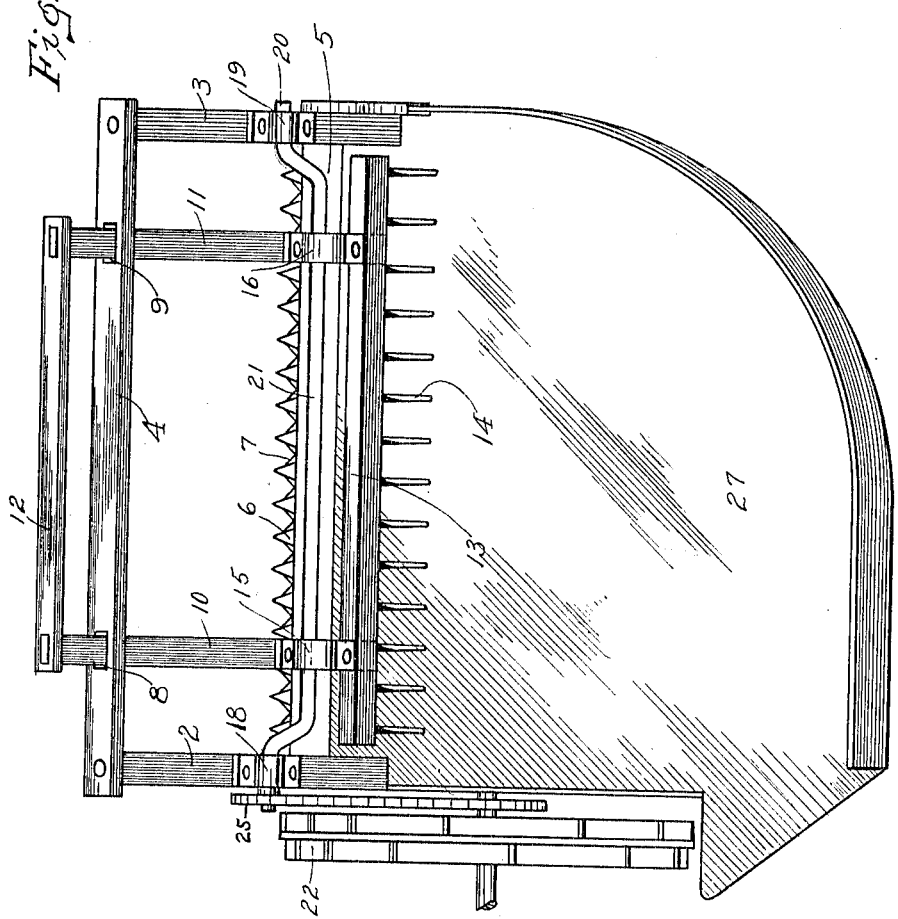

UNITED STATES PATENT OFFICE.

JOHN J. LEACH, OF JEWELL, OHIO.

CUTTER-BAR RAKING DEVICE.

1,080,568. Specification of Letters Patent. Patented Dec. 9, 1913.

Application filed February 23, 1912. Serial No. 679,395.

*To all whom it may concern:*

Be it known that I, JOHN J. LEACH, a citizen of the United States of America, residing at Jewell, in the county of Defiance and State of Ohio, have invented certain new and useful Improvements in Cutter-Bar Raking Devices, of which the following is a specification.

My invention relates to a cutter bar raking device adapted to be used in combination with a binder or mower which is especially useful in harvesting clover seed.

It is well-known to those who are skilled in the art that it is especially difficult to harvest clover seed because of its short length and the liability of the heads and seed to fall beneath the cutter bar. It is usual in harvesting clover seed to provide an extra man who follows the binder or mower and periodically rakes the seed and heads from the upper surface of the cutter bar into a pan to prevent the seed and heads which are usually filled with seed, as much as possible, from dropping on the soil where it is tramped upon and destroyed. This is a very difficult operation as the man using the rake is liable to reach in too far when his rake will be mixed up with the cutter bar and knives, or if not far enough, leaving the seed and heads upon the surface of the cutter bar, thereby clogging the cutting mechanism and permit the seed and heads to drop upon the soil.

The objects, therefore, of my invention are to provide a means of uniformly and automatically raking the seed and chaff from the surface of the cutter bar into a pan and keeping the surface of the cutter bar clear of chaff, the heads of the clover and the seed at all times, thereby overcoming the difficulties incident to the use of a hand rake, saving seed and labor.

A structural embodiment of the invention is illustrated in the accompanying drawings whereof—

Figure 1 is a side elevation of my device showing two positions of the rake frame. Fig. 2 is a rear end elevation in perspective of my device showing a pan attached to the mower frame and the rearward position of the rake and frame.

In describing this invention one side only will be described as it will be readily understood that the opposite side is an exact duplicate thereof.

In the drawings, reference numeral 1 represents one (the other is not shown but is a duplicate) of the frame bars upon which my device is mounted, 2 and 3 standards which are attached to the frame bars by any well-known means and held in a vertical position as shown in Fig. 2. A cross-bar 4 is fastened to the free ends of the standards, forming substantially an open sided rectangular frame. Reference numeral 5 represents the usual cutter bar of a binder and 6 and 7, the guards and knives thereof. The cross-bar 4 is provided with openings 8 and 9 to loosely engage the swinging bars 10 and 11 whose ends project above the cross-bar 4 and are secured together by the connecting bar 12 or by any well-known fastening means. The depending ends of the bars 10 and 11 are fastened to a rake bar 13 which carries the teeth 14 forming the raking framework which is suspended upon the cross-bar 4 by the rake bar 13 and arranged to oscillate and move in an upward direction when movement is imparted to it, as shown in Fig. 1. Caps 15 and 16 are attached adjacent to the lower ends of the bars 10 and 11 forming slots 17. Bearings 18 and 19 are attached to the standards 2 and 3 to receive and support the ends of a crank shaft 20. The crank portion 21 of the crank shaft extends almost the full length of the cutter bar, engaging the slots 17 formed by the caps 15 and 16 which are attached to the swinging bars 10 and 11.

Movement is imparted to the device through the medium of the ground wheel 22 which is mounted on the shaft 23 as follows: A sprocket wheel 24 is attached to the shaft 23, a similar but smaller sprocket wheel 25 is attached to one end of the crank shaft 20 and a chain 26 connects the sprocket wheels 24 and 25 together so that when movement is imparted to the ground wheel it is transmitted to crank shaft 20 imparting a rotary movement thereto.

The operation is as follows: Assuming that the teeth 14 of the raking frame are resting upon the forward edge of the cutter bar, when movement is imparted thereto the following movement of the rake teeth takes place: The crank 21 is brought in contact with the outer wall of the caps 15 and 16 which form the slots 17 and forces the teeth of the raking frame in a plane rearward direction until they have scraped the full upper surface of the cutter bar and the raking frame then pivots upon the bar 12, it being so arranged that the weight of the frame of the raking bar rests upon the cross-bar during this movement, the crank still pressing against the inner walls of the caps 15 and 16, force the teeth of the raking frame rearward into a pan 27 for a distance when the crank comes in contact with the upper walls 28 of the caps 15 and 16, imparting a slightly inclined upward movement to the frame, (as shown in dotted line A,) the rake frame pivoting upon the upper walls 28 until it passes over the center of the axis of the crank when the rake frame then descends until the teeth of the rake frame comes in contact with the forward edge of the surface of the cutter bar and the same movement of the teeth is repeated during each revolution of the crank shaft. The raking teeth describe a movement substantially the same as that shown by the dotted lines A shown in Fig. 1.

It will be observed that this device can be attached to any binder or mower and it provides an automatic means of raking or cleaning the cutter bar surface, effecting the saving heretofore referred to and further results in permitting the operator to do efficient work with ease and comfort without the assistance of an extra man. I do not confine myself to the exact structure shown as many deviations may be made without departing from the spirit of my invention.

In the claims when I use the term "imparting a simultaneous oscillating and upward movement" to define the movement of the points of the teeth, I mean substantially the movement heretofore described.

In the drawings, in Fig. 1, attention is called to the fact that the broken lines indicate the forward movement of the teeth and the rake frame, and the dotted lines, the rearward movement of the teeth of the rake frame and teeth into the pan.

I claim:

1. An attachment for raking the upper surface of the cutter-bar of mowers, the combination of an upright-frame, of a swinging-frame attached thereto provided with elongated slots, a crank-shaft engaging said slots whereby a swinging movement is imparted to the swinging-frame when the crank shaft is revolved, teeth carried by said swinging-frame, substantially as described.

2. An attachment for raking the upper surface of the cutter-bar of mowers, comprising the following instrumentalities: an upright-frame, a swinging-frame suspended from said upright-frame, said swinging-frame also being provided with slotted portions, teeth attached to said swinging-frame in proximity to the cutter bar, a crank-shaft engaging said slots and imparting a simultaneous oscillating and upward movement to the swinging-frame, to cause the teeth of the swinging-frame to contact with and clean the upper surface of the cutter-bar when the crank shaft is revolved, substantially as described and set forth.

In testimony whereof I affix my signature in presence of two witnesses.

JOHN J. LEACH.

Witnesses:
 DEY AYERS,
 J. A. DEINDOERFER.

---

Copies of this patent may be obtained for five cents each, by addressing the "Commissioner of Patents, Washington, D. C."